United States Patent [19]
Norton

[11] 3,873,610
[45] Mar. 25, 1975

[54] PROCESS FOR AROMATIC CARBOXYLIC ACIDS

[75] Inventor: Richard V. Norton, Wilmington, Del.

[73] Assignee: Sun Research and Development Co., St. Davids, Pa.

[22] Filed: May 17, 1973

[21] Appl. No.: 361,385

Related U.S. Application Data

[63] Continuation-in-part of Ser. No. 223,306, Feb. 3, 1972, abandoned.

[52] U.S. Cl. ............................................. 260/515 P
[51] Int. Cl... C07c 63/00, C07c 63/24, C07c 63/26
[58] Field of Search................................. 260/515 P

[56] References Cited
UNITED STATES PATENTS

| | | | |
|---|---|---|---|
| 2,979,526 | 4/1961 | Gasson et al. | 260/515 |
| 3,031,500 | 4/1962 | Gasson et al. | 260/515 |
| 3,113,964 | 12/1963 | Farkas et al. | 260/515 |

Primary Examiner—James A. Patten
Attorney, Agent, or Firm—George L. Church; Donald R. Johnson; Paul Lipsitz

[57] ABSTRACT

A process for making aromatic carboxylic acids from aromatic nitriles which comprises hydrolyzing to equilibrium an aqueous solution of said nitriles without catalyst at 200° to 300°C in the presence of hydrolysis products of said nitrile, venting steam and ammonia vapors at about 200° to about 300°C under autogeneous pressure and separating free aromatic carboxylic acid from said solution.

11 Claims, No Drawings

PROCESS FOR AROMATIC CARBOXYLIC ACIDS

RELATED APPLICATION

This is a continuation-in-part of Ser. No. 223,306 filed Feb. 3, 1972, now abandoned.

It is known to prepare aromatic carboxylic acids by ammoxidation of alkyl-substituted aromatic hydrocarbons to nitriles and hydrolyzing the nitriles to the desired acid. However, in separating the acids after the hydrolysis step it is found that the acid products contain nitrogenous impurities. Since the carboxylic acids so made, particularly isophthalic and terephthalic acids, are used as polymer intermediates for synthetic polyester fibers, it is necessary that they be purified to remove the nitrogen containing products and this, of course, is a costly procedure. More particularly, it is disclosed in Canadian Pat. No. 834,234 (Sze et al., issued Feb. 10, 1970) that terephthalonitrile or other aromatic nitrile may be hydrolyzed in the presence of an alkaline catalyst and, preferably, only a substantial portion of the terephthalonitrile is hydrolyzed, thus providing for recycle as catalysts the salts of terephthalic acid and of terephthalamic acid together with terephthalamide. Catalysts used in that process are alkali and alkaline earth metal hydroxides, carbonates, and salts or aromatic carboxylic acids including the ammonium salts of such acids. Ammonia is stripped from the hydrolysis product by contacting the product counter-currently with steam and the product is cooled to separate the terephthalic acid. In that disclosure it is further pointed out that where acids of extremely high purity are required, for example, as monomers for producing polymeric fibers in which discoloration results from the presence of minor amounts of nitrogen containing impurities. The acid is further purified by repulping the acid with water and again carrying out the catalytic hydrolysis at a temperature higher than the first hydrolysis, whereby the nitrogen-containing compounds are further hydrolyzed to the carboxylic acid. It will be understood, of course, that multiple purification steps are to be avoided and thus the process of this disclosure lacks the efficiency necessary for a commercially attractive hydrolysis procedure to obtain high grade aromatic carboxylic acid from the corresponding nitrile.

It has now been found that if the nitrile hydroylsis is carried out in a particular manner, hereinafter described, the nitrogen content of the acid products is significantly reduced. Thus, in accord with the invention, an aromatic carboxylic acid of low nitrogen content is prepared from the corresponding nitrile by the noncatalytic hydrolysis to equilibrium of an aqueous solution of said nitrile at about 200° to about 300°C in the presence of hydrolysis products of said nitrile, venting steam and ammonia vapors at about 200°C to about 300°C, and separating the free aromatic carboxylic acid from said solution. As indicated, the hydrolysis is noncatalytic; i.e., no free ammonia or other material is added to affect the hydrolysis rate. It is reported that alkaline materials such as ammonia, carbonates, and other alkalis catalyze nitrile hydrolysis, but no such materials are added to the system in the process of this invention. The pressure of the system is not critical to the process and it will be understood that when the process is carried out under the above conditions and autogenous pressure of about 200 to about 1500 psig will be generated. However, the process is also operable under higher pressures (achieved with nitrogen or other inert gases, for example) or at lower pressures (achieved by employing a vacuum system). For obvious economic reasons, however, the autogenous pressure generated will be used.

The process of the invention is applicable for the production of a wide variety of aromatic carboxylic acids. The aromatic nitrile starting material may be selected from any of those compounds where one or more cyanide radicals are attached directly to an aromatic ring compound; e.g., a benzene or naphthalene ring. Examples of nitrile falling within this class include benzonitrile, phthalonitrile, terephthalonitrile, isophthalonitrile, the toluonitriles, naphthonitriles and the like. Preferred nitriles for use in the process are the phthalonitriles, particularly isophthalonitrile and terephthalonitrile.

A key requirement mass the process of the invention is that the aqueous solution of aromatic nitrile undergoing hydrolysis contain nitrile hydrolysis intermediates and these are obtained from previous nitrile hydrolysis reaction solutions. It is also important that the hydrolysis be carried out so that equilibrium of the hydrolysis mas is reached, since it is the equilibrium mixture which contains the intermediates necessary to effect the benefits of the process. Still another important step in the process is the venting of steam and ammonia vapors after hydrolysis to equilibrium occurs, and in this venting step it is necessary to remove sufficient ammonia so that the free acid is formed rather than ammonium salts of the acid. It will be understood from the chemistry involved that for each nitrile group hydrolyzed one mole of ammonia is formed and for each mole of ammonia so derived in the equilibrium mixture more than 0.5 mole of ammonia must be removed by the venting step. Preferably, from about 0.75 to about 0.95 moles of ammonia will be removed for each mole of functional nitrile (e.g., nitrile equivalent) present in the aromatic nitrile compound hydrolyzed and this is readily determined by titration of samples the vented stream. Expressed another way, more than 50%, preferably 75% to 95%, of the ammonia formed by the hydrolysis must be removed by venting.

It is to be understood also that addition of nitrile hydrolysis products from sources other than the previous nitrile hydrolysis reaction solutions will also have a beneficial effect, but for convenience and economy, the recycle streams will be employed as indicated. It is also to be understood that nitriles and/or other precursors of nitrile hydrolysis products may be added so as to quickly increase the concentration of such hydrolysis products in the recycle stream and reduce the number of recycles to achieve the desired purity of product. Thus, acetonitrile, benzonitrile, succinonitrile, the toluonitriles, and the like may be added if desired. It has now been found that the higher the concentration of these hydrolysis intermediates in the recycle streams, the less nitrogen is present in the next recovered acid product. These nitrile hydrolysis intermediates may be expressed in terms of carboxylic acid (COOH) hydrolysis equivalents and to obtain acid products which will have a significantly lowered nitrogen content in accord with the invention, the hydrolysis medium will contain from about 0.45 to about 2.0, preferably from about 0.6 to about 1.2, most preferred about 1.0, recycle carboxylic acid hydrolysis equivalents per equivalent of nitrile charged. These intermediates are introduced into the system by recycling the filtrates from previous hydrolysis. In order to keep liquid volumes under control, the recycle filtrate may, of course, be concentrated by evaporation of a portion of the water before adding it to the next hydrolysis. It is not known how these intermediates function to lower the nitrogen content in the aromatic acid products, but it has been determined that the mere presence of ammonium salts is ineffective for this purpose.

It has been determined in the case of terephthalonitrile hydrolysis that the major intermediate hydrolysis products consist of 4-cyanobenzoic acid (as its ammonium salt), 4-cyanobenzamide, terephthalamide, and the ammonium salt of terepthalamic acid. Some terephthalic acid and its mono- and diammonium salt is also in the recycle stream, but these materials do not contribute to the beneficial effects of the process of the invention. It is expected that with other nitrile hydrolysis reactants, corresponding hydrolysis products will be formed.

In order to illustrate the invention, the following Examples are given:

GENERAL PROCEDURE

The reactants were charged into a 2 liter titanium pressure reactor and heated to 300°C at an autogenous pressure of 1200 psig. The solution was held at these conditions for about 45 minutes to allow equilibration to occur among the hydrolysis intermediates, whereupon a vapor vent line was opened and the steam-ammonia vapor was condensed, collected, and titrated with standard hydrochloric acid solution. During the venting, distilled water was continuously added to the reactant solution by means of a pressure delivery system at 1400 psig so as to balance the quantity of distillate from the reactor and generate the acid in-situ. After a suitable quantity of ammonia had been collected, the reactor was cooled to atomspheric pressure, opened, and the slurry of aromatic carboxylic acid rapidly filtered at 98°–100°C. A continuously operating process will utilize pressure filtration equipment at a steam pressure up to about 200 psig. The crystalline carboxylic acid was then rinsed with 500 ml of boiling distilled water to remove the occluded filtrate solution, after which the carboxylic acid crystals were dried at 120°C and their nitrogen content determined by a combustion analysis.

The combined wash and reaction filtrates were concentrated and used as the reactant solution for the next recycle experiment.

EXAMPLE 1

In the manner described above, isophthalonitrile (120 g, 1 mole) was added to diammonium isophthalate (200 g, 1 mole) dissolved in 1 liter of distilled water. After equilibration of the solution at 300°C for 45 minutes, distillation at 300°C released 1.51 moles of free ammonia. Workup of the reactant slurry yielded isophthalic acid (138.1 g, 0.83 moles) containing 3.41% nitrogen as isophthalamic acid.

It is clear from this example, in view of the high nitrogen content of the aromatic acid product, that the presence of the diammonium salt of the acid was ineffective to give a product of low nitrogen content.

EXAMPLE 2

In a manner identical to Example 1, isophthalonitrile (256 g, 2 moles), as a slurry in 1 liter of deionized water, was charged into the 2 liter titanium reactor and distillation at 300°C released 2.02 moles of free ammonia. Product workup of the reactant slurry yielded isophthalic acid (144.4 g, 0.86 moles) containing 1.48% nitrogen as isophthalamic acid.

It is evident from this example the even the use of deionized water is not effective in permitting a low nitrogen product to be obtained.

EXAMPLE 3

In the manner of the generalized description, a series of reaction filtrate recycle experiments on isophthalonitrile (iPN) hydrolysis was conducted whereby the reaction and wash filtrates from the previous experiment were used as the reactant solution for a fresh nitrile charge. The equilibration and distillation were done at 300°C. The following table indicates the decreasing nitrogen content of the iPA acid products as the concentration of nitrile reaction intermediates becomes a steady value. This steady concentration of reaction intermediates is apparent from the columns of data showing the COOH equivalents in the recycle stream divided by the nitrile equivalents in the feed. This value is multiplied by 100 and expressed on a percent basis. The results obtained are shown in Table I.

TABLE I

| Recycle | iPN (moles) | Reactant Composition Aqueous Solution | Moles in iPA Equivalents in Recycle | Total iPA Equivalents in Reactor | COOH Equivalents in Recycle ÷ Nitrile Equivalents in Feed × 100 | $NH_3$ Distilled (moles) | Isophthalic Acid Product g | mole | %N |
|---|---|---|---|---|---|---|---|---|---|
| A | 2 | 1 l. distilled $H_2O$ | 0.00 | 2.00 | 0% | 2.01 | 144.0 | 0.87 | 1.48 |
| B | 2 | filtrate from A | 1.11 | 3.11 | 55% | 2.06 | 209.1 | 1.26 | 1.34 |
| C | 1 | filtrate from B | 1.83 | 2.83 | 183% | 2.00 | 206.9 | 1.25 | 1.41 |
| D | 1 | filtrate from C | 1.56 | 2.56 | 156% | 1.96 | 185.8 | 1.12 | 1.03 |
| E | 1 | filtrate from D | 1.42 | 2.42 | 142% | 1.71 | 153.5 | 0.93 | 1.06 |
| F | 1 | filtrate from E | 1.47 | 2.47 | 147% | 1.65 | 159.1 | 0.97 | 0.88 |
| G | 1 | filtrate from F | 1.48 | 2.48 | 148% | 1.70 | 157.5 | 0.95 | 0.87 |
| H | 1 | filtrate from G | 1.51 | 2.51 | 151% | 1.79 | 160.7 | 0.97 | 0.75 |
| I | 1 | filtrate from H | 1.52 | 2.52 | 152% | 1.69 | 152.7 | 0.92 | 0.76 |
| J | 1 | filtrate from I | 1.58 | 2.58 | 158% | 1.75 | 162.3 | 0.97 | 0.67 |
| K | 1 | filtrate from J | 1.59 | 2.59 | 159% | 1.74 | 155.2 | 0.94 | 0.61 |
| L | 1 | filtrate from K | 1.63 | 2.63 | 163% | 1.72 | 155.2 | 0.94 | 0.50 |

As can be seen from the above table, the percent nitrogen in the acid product is reduced as the recycle runs progress. These are a few inconsistencies (recycle C, E, and I), but this is a reflection of experimental error and the unsteady-state nature of the reactant composition. However, it is quite clear that there is a definite trend toward significantly purer product as the recycle runs continue.

EXAMPLE 4

In the manner of Example 3, a recycle experiment was conducted using as the original reactant solution 1 mole of isophthalonitrile and 1 mole of diammonium isophthalate (DAiPA) at 300°C. The results obtained are shown in Table II.

TABLE II

| Re-Cy-cle | Reactant Composition iPN (moles) | Aqueous Solution | Moles of iPA Equivalents in Recycle | Total iPA Equivalents in Reactor | COOH Equivalents in Recycle ÷ Nitrile Equivalents in Feed × 100 | NH₃ Distilled (moles) | Isophthalic Acid Product | | |
|---|---|---|---|---|---|---|---|---|---|
| | | | | | | | g | mole | %N |
| A | 1 | 1 mole DAiPA in 1 l. dist. H₂O | 1.00 | 2.00 | 0% | 1.71 | 138.1 | 0.83 | 3.41 |
| B | 1 | filtrate from A | 1.15 | 2.15 | 115% | 1.71 | 178.7 | 1.08 | 2.76 |
| C | 1 | filtrate from B | 1.05 | 2.05 | 105% | 1.71 | 172.5 | 1.04 | 1.27 |
| D | 1 | filtrate from C | 0.99 | 1.99 | 99% | 1.78 | 169.5 | 1.02 | 0.97 |
| E | 1 | filtrate from D | 0.94 | 1.94 | 94% | 1.81 | 174.6 | 1.05 | 0.93 |

This experiment illustrates that even with a large amount of the diammonium salt present, the recycle technique of the invention is effective in reducing the nitrogen content of the acid produced.

EXAMPLE 5

In the manner of the general description recycle experiments were conducted using 0.5 mole charges of isophthalonitrile at an equilibration temperature of 290°C for 40–50 minutes and a distillation temperature of 290°C initial to 260°C final. The results obtained are shown in Table III.

TABLE III

| Recycle | Reactant Composition iPN (moles) | Aqueous Solution | Moles of iPA Equivalents in Recycle | Total iPA Equivalents in Reactor | COOH Equivalents in Recycle ÷ Nitrile Equivalents in Feed × 100 | NH₃ Distilled (moles) | Isophthalic Acid Product | | |
|---|---|---|---|---|---|---|---|---|---|
| | | | | | | | g | mole | %N |
| A | 0.5 | 1 l. H₂O | 0.00 | 0.5 | 0% | 0.66 | 66.0 | 0.33 | 0.26 |
| B | 0.5 | filtrate from A | 0.17 | 0.67 | 34% | 0.88 | 77.6 | 0.47 | 0.12 |
| C | 0.5 | filtrate from B | 0.20 | 0.70 | 40% | 0.94 | 80.5 | 0.49 | 0.13 |
| D | 0.5 | filtrate from C | 0.21 | 0.71 | 42% | 0.91 | 75.6 | 0.45 | 0.08 |
| E | 0.5 | filtrate from D | 0.25 | 0.75 | 50% | 0.90 | 76.6 | 0.46 | 0.07 |
| F | 0.5 | filtrate from E | 0.29 | 0.79 | 58% | 0.91 | 78.6 | 0.47 | 0.08 |

EXAMPLE 6

In the manner of the generalized experiment, a mixture of isophthalonitrile (0.5 moles), acetonitrile (0.2 moles) and water (70 moles) was reacted at 290°C for 1 hour and distilled the ammonia at 290°C. The following data were obtained (Table IV):

TABLE IV

| Re-cy-cle | Reactant Composition iPN (moles) | Aqueous Solution | Moles of iPA Equivalents in Recycle | Total iPA Equivalents in Reactor | COOH Equivalents in Recycle ÷ Nitrile Equivalents in Feed × 100 | NH₃ Distilled (moles) | Isophthalic Acid Product | | |
|---|---|---|---|---|---|---|---|---|---|
| | | | | | | | g | mole | %N |
| A | 0.5 | 0.2 moles acetonitrile 70 moles H₂O | 0.00 | 0.50 | 0% | 0.91 | 65.5 | 0.39 | 0.47 |
| B | 0.5 | filtrate from A | 0.11 | 0.61 | 22% | 0.86 | 63.0 | 0.38 | 0.22 |
| C | 0.5 | filtrate from B | 0.23 | 0.73 | 46% | 0.68 | 70.0 | 0.42 | 0.06 |
| D | 0.5 | filtrate from C | 0.31 | 0.81 | 62% | 0.83 | 69.8 | 0.42 | 0.04 |

In the above experiment, acetonitrile was added since it is a precursor to acetamide and ammonium acetate. As can be seen from the results, the percent nitrogen in the isophthalic acid product is extremely low after the second recycle (Recycle C and D). Thus, the beneficial effects of nitrile hydrolysis products is again clearly evident.

EXAMPLE 7

In the manner of the general description, recycle experiments were conducted using an initial charge of isophthalonitrile (0.5 moles) in water (50 moles) containing dipotassium isophthalate (0.5 moles). In experiments A and B, only a small portion of the available ammonia was vented so as to develop a concentrated solution of hydrolysis intermediates for recycle in C through F. The equilibration was for 1 hour at 300°C for each run and distillation was at 295°C to 300°C. The results obtained are shown in Table V.

TABLE V

| Recycle | Reactant Composition iPN (moles) | Aqueous Solution | Moles of iPA Equivalents in Recycle | Total iPA Equivalents in Reactor | COOH Equivalents in Recycle ÷ Nitrile Equivalents in Feed × 100 | NH₃ Dis-Distilled (moles) | Isophthalic Acid Product | | |
|---|---|---|---|---|---|---|---|---|---|
| | | | | | | | g | mole | %N |
| A | 0.5 | 0.5 Dipotassium isophthalate 50 moles of H₂O | 0.00 | 0.5 | 0% | 0.52 | 44.1 | 0.27 | 0.90 |
| B | 0.5 | filtrate from A | 0.23 | 0.73 | 46% | 0.56 | 41.6 | 0.25 | 1.54 |
| C | 0.5 | filtrate from B | 0.48 | 0.98 | 96% | 1.01 | 95.1 | 0.57 | 0.98 |
| D | 0.5 | filtrate from C | 0.41 | 0.91 | 82% | 1.09 | 95.5 | 0.57 | 0.42 |
| E | 0.5 | filtrate from D | 0.34 | 0.84 | 68% | 0.89 | 86.0 | 0.52 | 0.23 |
| F | 0.5 | filtrate from E | 0.32 | 0.82 | 64% | 0.86 | 68.0 | 0.41 | 0.21 |

The apparent inconsistency of Recycle B as compared to A is due to the need to line out the equipment or otherwise reach a steady state system. It will be observed that Recycles C through F show a consistent decrease in nitrogen in the isophthalic acid product.

EXAMPLE 8

In the manner of the general description, recycle experiments to prepare terephthalic acid (TPA) were conducted using an initial charge of 1.0 mole of terephthalonitrile (TPN) in 55 moles of water containing 1.0 mole of diammonium terephthalate (DAT). The mixture for each experiment was equilibriated at 300°C for 50 minutes and distillation was at 295°–305°C. The results obtained are shown in Table VI.

somewhat lower nitrogen containing product is obtained.

EXAMPLE 9

In the manner of the general description, recycle experiments were conducted using an initial charge of 1.5 moles of terephthalonitrile in 55 moles of water containing 1.0 mole of diammonium terephthalate. The recycle mixtures were equilibrated for 30 minutes at 300°C prior to distillation at 300°C. The results obtained are shown in Table VII.

TABLE VII

| Recycle | TPN (moles) | Aqueous Solution of TPA Equivalents From Recycle | | | Total COOH Equivalents in Reactor | NH₃ Distilled (moles) | TPA Product g | mole | %N | Reactant Ratio COOH Equivalents ÷CN Equivalents |
|---|---|---|---|---|---|---|---|---|---|---|
| A | 1.5 | 1 l. H₂O | (1 | mole DAT) | 5.00 | 1.72 | 308.0 | 1.81 | 5.06 | — |
| B | 1.5 | 1 l. H₂O | (0.69 | TPA eq.) | 4.38 | 1.72 | 265.5 | 1.56 | 4.29 | 46% |
| C | 1.5 | " | 0.63 | " | 4.26 | 1.66 | 244.5 | 1.44 | 3.31 | 41% |
| D | 1.5 | " | 0.69 | " | 4.38 | 1.72 | 255.6 | 1.50 | 3.73 | 46% |
| E | 1.5 | " | 0.69 | " | 4.38 | 1.73 | 244.6 | 1.44 | 3.38 | 46% |
| F | 1.5 | " | 0.75 | " | 4.50 | 1.72 | 233.4 | 1.37 | 3.34 | 54% |
| G | 1.5 | " | 0.88 | " | 4.76 | 1.72 | 241.1 | 1.42 | 3.30 | 58% |

EXAMPLE 10

In the manner of the general description, recycle experiments were conducted using an initial charge of 0.5 moles 2,6-dicyanonaphthalene (2,6-DCYN) in 55 moles of water containing 0.5 moles of diammonium 2,6-naphthalenedicarboxylate (DA-2,6-NDCA). The recycle mixtures were equilibrated for 30 minutes at 300°C and distilled at 250°C. The results obtained are shown in Table VIII.

TABLE VI

| Recycle | TPN (moles) | Aqueous Solution of TPA Equivalents From Recycle | | | Total COOH Equivalents in Reactor | NH₃ Distilled (moles) | TPA Product g | mole | %N | Reactant Ratio COOH Equivalents ÷CN Equivalents |
|---|---|---|---|---|---|---|---|---|---|---|
| A | 1.0 | 1 l. | (1 mole DAT) | | 4.00 | 1.72 | 230.6 | 1.39 | 5.48 | — |
| B | 1.0 | 1 l. | (0.59 mole TPA eq.) | | 3.18 | 1.73 | 193.9 | 1.17 | 2.88 | 59% |
| C | 1.5 | " | 0.40 | " | 3.80 | 1.72 | 256.2 | 1.55 | 6.46 | 27% |
| D | 1.5 | " | 0.33 | " | 3.66 | 1.72 | 243.1 | 1.46 | 5.28 | 22% |
| E | 1.5 | " | 0.35 | " | 3.70 | 1.70 | 214.2 | 1.29 | 4.83 | 23% |
| F | 1.5 | " | 0.54 | " | 4.08 | 1.72 | 237.4 | 1.43 | 4.46 | 36% |
| G | 1.5 | " | 0.59 | " | 4.18 | 1.72 | 209.7 | 1.27 | 4.23 | 40% |

The unsteady state nature of the system in experiments A and B are reflected in the %N discontinuity again showing that lining out of the system is desirable. In experiments C through G the reactor conditions were sufficiently stabilized so as to yield the characteristic decreasing nitrogen values. It should be noted, however, that although the drop in nitrogen in the product is evident, this decrease is relatively small because the reactant ratio of carboxyl equivalents per nitrile function is below the 0.45 (e.g., 45%) at which value greater nitrogen decreases are obtained. Thus, the Example 9 (Table VII) which follows, where the carboxyl equivalents per nitrile is slightly higher, a

TABLE VIII

| Recycle | 2,6-DCYN (moles) | Aqueous Solution of TPA Equivalents From Recycle | | | Total COOH Equivalents in Reactor | NH₃ Distilled (moles) | 2,6-NDCA g | mole | %N | Reactant Ratio COOH Equivalents ÷CN Equivalents |
|---|---|---|---|---|---|---|---|---|---|---|
| A | 0.5 | 1 l. | (0.5 | mole DA-2,6-NDCA) | 2.00 | 0.69 | 162 | 0.75 | 6.21 | — |
| B | 0.5 | " | 0.25 | " | 1.50 | 0.50 | 92 | 0.45 | 5.24 | 50% |
| C | 0.5 | " | 0.30 | " | 1.60 | 0.51 | 113 | 0.52 | 4.21 | 60% |
| D | 0.5 | " | 0.28 | " | 1.56 | 0.51 | 117 | 0.54 | 4.32 | 58% |
| E | 0.5 | " | 0.24 | " | 1.48 | 0.50 | 106 | 0.49 | 4.28 | 48% |
| F | 0.5 | " | 0.25 | " | 1.50 | 0.51 | 110 | 0.51 | 4.17 | 50% |
| G | 0.5 | " | 0.24 | " | 1.48 | 0.50 | 108 | 0.50 | 4.05 | 48% |

The invention claimed is:

1. A process for making aromatic carboxylic acids from aromatic nitriles comprising the non-catalytic hydrolysis to equilibrium of an aqueous solution of said nitriles at 200° to 300°C in the presence of soluble recycled hydrolysis products of said nitrile separated from admixture with precipitated aromatic acids obtained in the process, the hydrolysis medium containing from about 0.45 to about 2.0 recycle carboxylic acid hydrolysis equivalents per mole of nitrile, venting steam and ammonia vapors at about 200° to about 300°C and at autogenous pressure, the amount of ammonia vented being more than 50% of that formed from said nitrile, cooling to precipitate free aromatic carboxylic acid, separating said solid acid from the solution of soluble products and recycling said aqueous solution to a subsequent hydrolysis.

2. The process of claim 1 where the nitrile hydrolyzed is a phthalonitrile.

3. The process of claim 1 where the nitrile hydrolyzed is isophthalonitrile.

4. The process of claim 1 where the nitrile hydrolyzed is terephthalonitrile.

5. The process of claim 1 where the nitrile hydrolyzed is 2,6-dicyanonaphthalene.

6. The process of claim 1 where a nitrile other than that hydrolyzed is added to the reaction.

7. The process of claim 6 were the nitrile added is acetonitrile.

8. A process for making aromatic carboxylic acids from phthalonitriles comprising the non-catalytic hydrolysis to equilibrium of an aqueous solution of said nitriles at 200° to 300°C in the presence of soluble recycled hydrolysis products of said nitriles separated from admixture with precipitated aromatic acids obtained in the process, the hydrolysis medium containing from about 0.6 to about 1.2 recycle carboxylic acid hydrolysis equivalents per mole of nitrile, venting steam and ammonia vapors at about 200° to about 300°C and at autogenous pressure, the amount of ammonia vented being between about 75% and 95% of that formed from said nitrile, cooling to precipitate aromatic carboxylic acid, separating said solid acid from the solution of soluble products and recycling said aqueous solution to a subsequent hydrolysis.

9. The process of claim 8 where the nitrile is isophthalonitrile and the recycle carboxylic acid hydrolysis equivalents per mole of nitrile is from about 0.6 to about 1.

10. The process of claim 8 where the nitrile is terephthalonitrile and the recycle carboxylic acid hydrolysis equivalents per mole of nitrile is about 1.

11. The process of claim 8 where acetonitrile is added to the system.

* * * * *